(12) United States Patent
Duquesne

(10) Patent No.: US 12,039,660 B1
(45) Date of Patent: Jul. 16, 2024

(54) RENDERING THREE-DIMENSIONAL CONTENT BASED ON A VIEWPORT

(71) Applicant: Apple Inc., Cupertino, CA (US)

(72) Inventor: Gregory Duquesne, Belmont, CA (US)

(73) Assignee: Apple Inc., Cupertino, CA (US)

( * ) Notice: Subject to any disclaimer, the term of this patent is extended or adjusted under 35 U.S.C. 154(b) by 178 days.

(21) Appl. No.: 17/709,294

(22) Filed: Mar. 30, 2022

Related U.S. Application Data

(60) Provisional application No. 63/169,123, filed on Mar. 31, 2021.

(51) Int. Cl.
*G06T 15/20* (2011.01)
*G06T 15/80* (2011.01)

(52) U.S. Cl.
CPC .............. *G06T 15/20* (2013.01); *G06T 15/80* (2013.01)

(58) Field of Classification Search
None
See application file for complete search history.

(56) References Cited

U.S. PATENT DOCUMENTS

| | | | | |
|---|---|---|---|---|
| 4,862,392 A | * | 8/1989 | Steiner | G06T 15/06 345/506 |
| 6,160,559 A | * | 12/2000 | Omtzigt | G06T 11/40 345/428 |
| 7,561,155 B1 | * | 7/2009 | Gardiner | G06T 15/005 345/545 |
| 9,519,997 B1 | * | 12/2016 | Ryu | G06T 13/20 |
| 2014/0160124 A1 | * | 6/2014 | Bavoil | G06T 15/506 345/420 |
| 2018/0122104 A1 | * | 5/2018 | Jeong | G06T 15/04 |
| 2021/0211722 A1 | * | 7/2021 | Hur | H04N 19/597 |

FOREIGN PATENT DOCUMENTS

| | | | | |
|---|---|---|---|---|
| EP | 3540696 A1 | * | 9/2019 | G06T 11/40 |
| EP | 3437072 B1 | * | 10/2020 | G06T 11/001 |

* cited by examiner

*Primary Examiner* — Patrick F Valdez
(74) *Attorney, Agent, or Firm* — Fish & Richardson P.C.

(57) ABSTRACT

In an example method, a computer system accesses first data representing three-dimensional content and a plurality of bounding boxes. Each of the bounding boxes encloses at least a portion of the three-dimensional content. The computer system also access second data representing a viewing frustum for rendering the three-dimensional content. Based on the first and the second data, the computer system identifies a subset of the bounding boxes that are visible according to the viewing frustum. For each of the one or more bounding boxes of the subset, the computer system identifies an image tile from among a plurality of image tiles corresponding to the bounding box, and renders one or more video frames in a frame buffer based on the identified image tile.

30 Claims, 7 Drawing Sheets

*Bounding Boxes*

RENDERING THREE-DIMENSIONAL CONTENT BASED ON A VIEWPORT

CROSS-REFERENCE TO RELATED APPLICATION

This application claims priority to U.S. Provisional Patent Application No. 63/169,123, filed Mar. 31, 2021, the entire contents of which are incorporated herein by reference.

TECHNICAL FIELD

This disclosure relates generally to rendering three-dimensional content.

BACKGROUND

Computer systems can be used to generate and display three-dimensional content. As an example, a computer system can generate a three-dimensional model representing the physical characteristics and/or visible appearance of an object. Further, the computer system can render a visual representation of the three-dimensional model, such that it can be viewed by a user on a display device. In some implementations, a visual representation of the three-dimensional model can be displayed according to two dimensions (e.g., using a flat panel display, such as a liquid crystal display or a light emitting diode display). In some implementations, a visual representation of the three-dimensional model can be displayed according to three dimensions (e.g., using a virtual reality headset, an augmented reality headset, a mixed reality headset, or a holographic display).

SUMMARY

In an aspect, a method includes accessing, by a computer system, first data representing three-dimensional content and a plurality of bounding boxes, where each of the bounding boxes encloses at least a portion of the three-dimensional content; accessing, by the computer system, second data representing a viewing frustum for rendering the three-dimensional content; based on the first and the second data, identifying, by the computer system, a subset of the bounding boxes that are visible according to the viewing frustum; and for each of the one or more bounding boxes of the subset: identifying an image tile from among a plurality of image tiles corresponding to the bounding box, and rendering one or more video frames in a frame buffer based on the identified image tile.

Implementations of this aspect can include one or more of the following features.

In some implementations, identifying the subset of the bounding boxes can include determining a viewport for rendering the three-dimensional content based on the viewing frustum, and determining that the subset of the bounding boxes are visible according to viewport.

In some implementations, rendering the one or more video frames in the frame buffer can include scanning pixels of the identified image tile into a geometry buffer.

In some implementations, the pixels of the identified image tile can be retrieved from a mipmap including a plurality of portions. Each of the portions can correspond to a respective distance from a viewpoint of the viewing frustum.

In some implementations, the pixels of the identified image tile can be retrieved from a mipmap including a plurality of portions. Each of the portions can correspond to a respective level of detail.

In some implementations, rendering the one or more video frames in the frame buffer can include drawing, in the geometry buffer, one or more polygons connecting the pixels.

In some implementations, the one or more polygons can include one or more triangles.

In some implementations, rendering the one or more video frames in the frame buffer can include scanning the pixels in the geometry buffer into the frame buffer.

In some implementations, rendering the one or more video frames in the frame buffer can include shading the pixels of the frame buffer.

In some implementations, the three-dimensional content can include one or more three-dimensional models.

Other implementations are directed to systems, devices, and non-transitory, computer-readable media having instructions stored thereon, that when executed by one or more processors, cause the one or more processors to perform operations described herein.

The details of one or more embodiments are set forth in the accompanying drawings and the description below. Other features and advantages will be apparent from the description and drawings, and from the claims.

DETAILED DESCRIPTION

This disclosure describes systems and techniques for rendering three-dimensional content. In an example implementation, a computer system can receive one or more images that indicate the locations of several points on a surface of an object. Based on these images, the computer system can generate corresponding pixels in a geometry buffer of a renderer, and interconnect the pixels in the geometry buffer (e.g., to fill in the shape of the object). Further, the computer system can scan the pixels of the geometry buffer into a frame buffer of the renderer, and instruct a display device to present the pixels to a user.

The techniques described herein enable three-dimensional content to be directly rendered from images into a geometry buffer and frame buffer, without requiring that three-dimensional models (e.g., polygon meshes) be generated during the rendering process to represent each of the objects in the three-dimensional content. These techniques can be beneficial, for instance, in reducing the resources that that are needed to render and display three-dimensional content. As an example, these techniques can reduce an expenditure of computational resources (e.g., CPU utilization), network resources (e.g., bandwidth utilization), memory resources, and storage resources by a computer system in rendering and displaying three-dimensional content to a user.

Additional details regarding these rendering techniques are described herein.

Figure 1:
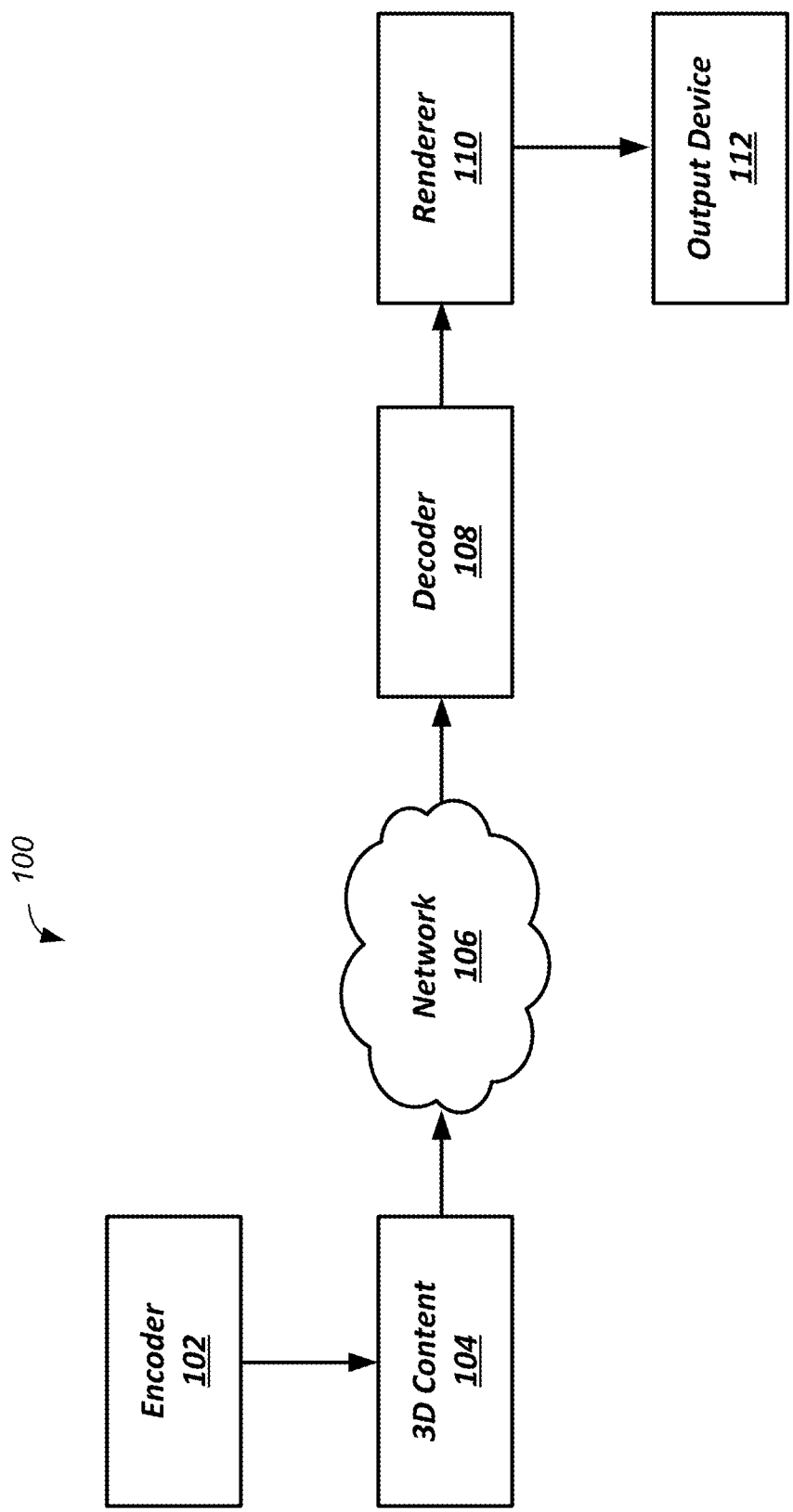
FIG. 1 is a diagram of an example system for processing and displaying three-dimensional content.

FIG. 1 is a diagram of an example system 100 for processing and displaying three-dimensional content. The system 100 includes an encoder 102 that generates three-dimensional content 104, a network 106, a decoder 108, a renderer 110, and an output device 112.

During an example operation of the system 100, the encoder 102 generates three-dimensional content 104. In some implementations, three-dimensional content 104 may be referred to as volumetric content. In some implementations, three-dimensional content can be represented using one or more two-dimensional images that indicate the location of each of several points on the object, and the physical characteristics and/or the visual appearance of that object at each of those points.

As an example, one or more geometry images can be used to indicate the spatial location of each of several points of an object. For instance, each pixel of a geometry image can correspond to a particular point on a surface of the object, and the color of the pixel can indicate that spatial location of that point. In some implementations, the red, green, and blue values of each pixel can indicate the spatial location of a respective point in according to x, y, and z axes in a Cartesian coordinate system. In some implementations, the one or more geometry images can be subdivided into one or more image tiles (e.g., portions of an overall image). In some implementations, the geometry images and/or their corresponding image tiles can be four-sided images (e.g., square or rectangular images).

In some implementations, each of the geometry images (or image tiles thereof) can be associated with a different respective bounding box that encloses at least a portion of the object. As an example, each bounding box can be a three-dimensional cuboid having six quadrilateral faces. Each face can face in a different direction with respect to a coordinate axes (e.g., the six faces can face in a positive x-direction, in a negative x-direction, in a positive y-direction, in a negative y-direction, in a positive z-direction, and in a negative z-direction, respectively). In some implementations, at least some of the bounding boxes can have dimensions that are different from those of other ones of the bounding boxes. In some implementations, at least some of the bounding boxes can overlap after ones of the bounding boxes in space.

Further, one or more corresponding normal maps can be used to indicate the surface normal of the object at each of the points indicated in the geometry images. For example, each pixel of a normal map can correspond to a particular point indicated by the geometry images, and the color of the pixel can indicate the surface vector of the object at that point. In some implementations, the red, green, and blue values of each pixel can indicate the x, y, and z components of a normal vector for a respective point on a surface of the object according to a Cartesian coordinate system. In some implementations, the one or more normal maps also can be subdivided into one or more image tiles. In some implementations, the normal maps and/or their corresponding image tiles can be four-sided images (e.g., square or rectangular images).

Further, an object can also be represented using one or more additional images that include additional information regarding the object. For example, each additional image can include information such as a texture of an object at a particular location, a color of an object at that location, and/or a visual pattern of the object at that location. In some implementations, each additional image can correspond to a different respective portion of the object, and can provide information regarding that portion of the object. In some implementations, each additional image can be a UV image that enables information to be mapped to the surface of a surface of the object via UV mapping (e.g., where "U" and "V" refer of the axes of a two-dimensional image). In some implementations, the one or more additional images also can be subdivided into one or more image tiles. In some implementations, the additional images and/or their corresponding image tiles can be four-sided images (e.g., square or rectangular images).

In some implementations, at least some of the geometry images, normal maps, and/or additional images can be mipmaps. As an example, a mipmap can be a pre-calculated sequences of images, each of which is a progressively lower resolution representation of the previous. Information regarding portions of the three-dimensional content that are closer to the point of view of the rendering can be presented using higher resolution portions of a mipmap, such that a greater level of detail can be presented to user. Further, information regarding portions of the three-dimensional content that are further from the point of view of the rendering can be presented using lower resolution portions of a mipmap, such that a lower level of detail is presented to user (e.g., to conserve processing resources).

In some implementations, the encoder 102 can generate the three-dimensional content using a photogrammetry process. For example, the encoder 102 can receive image data regarding one or more objects obtained from several different perspectives (e.g., a series of images taken of the one or more objects from different angles and/or distances). Based on the image data, the encoder 102 can determine the shape of the object, and generate a three-dimensional model having or approximating that shape. Further, the encoder 102 can generate one or more geometry images, normal maps, and/or other additional images to represent the three-dimensional model.

In some implementations, the encoder 102 can generate the three-dimensional content based on measurements obtained by light detection and ranging (LIDAR) systems, three-dimensional cameras, and/or three-dimensional scanners. For example, a LIDAR system can obtain information regarding an object, such as a point cloud representing the spatial locations of several points on the object's surface. Based on the point cloud, the encoder 102 can determine the shape of the object, and generate a three-dimensional model having or approximating that shape. Further, the encoder 102 can generate one or more geometry images, normal maps, and/or other additional images to represent the three-dimensional model.

The three-dimensional content 104 is provided to a decoder 108 for processing. In some implementations, the three-dimensional content 104 can be transmitted to the decoder 108 via a network 106. The network 106 can be any communications networks through which data can be transferred and shared. For example, the network 106 can be a local area network (LAN) or a wide-area network (WAN), such as the Internet. The network 106 can be implemented using various networking interfaces, for instance wireless networking interfaces (e.g., Wi-Fi, Bluetooth, or infrared) or wired networking interfaces (e.g., Ethernet or serial connection). The network 106 also can include combinations of more than one network, and can be implemented using one or more networking interfaces.

The decoder 108 receives the three-dimensional content 104, and extracts information regarding the three-dimensional models included in the three-dimensional content 104. For example, if the encoder 102 compressed the data representing the three-dimensional computer models, the decoder 108 can decompress the data. As another example, if the encoder 102 generated one or more bounding boxes and images representing an object, the decoder can extract data regarding the bounding boxes and images from the three-dimensional content 104 for further processing.

The decoder 108 provides the decoded data to the renderer 110. The renderer 110 renders content based on the decoded data, and presents the rendered content to a user using the output device 112. As an example, if the output device 112 is configured to present content according to two dimensions (e.g., using a flat panel display, such as a liquid crystal display or a light emitting diode display), the renderer 110 can render the content according to two dimensions and according to a particular perspective, and instruct the output device 112 to display the content accordingly. As another example, if the output device 112 is configured to present content according to three dimensions (e.g., using a virtual reality headset, an augmented reality headset, a mixed reality headset, or a holographic display), the renderer 110 can render the content according to three dimensions and according to a particular perspective, and instruct the output device 112 to display the content accordingly.

Figure 2:
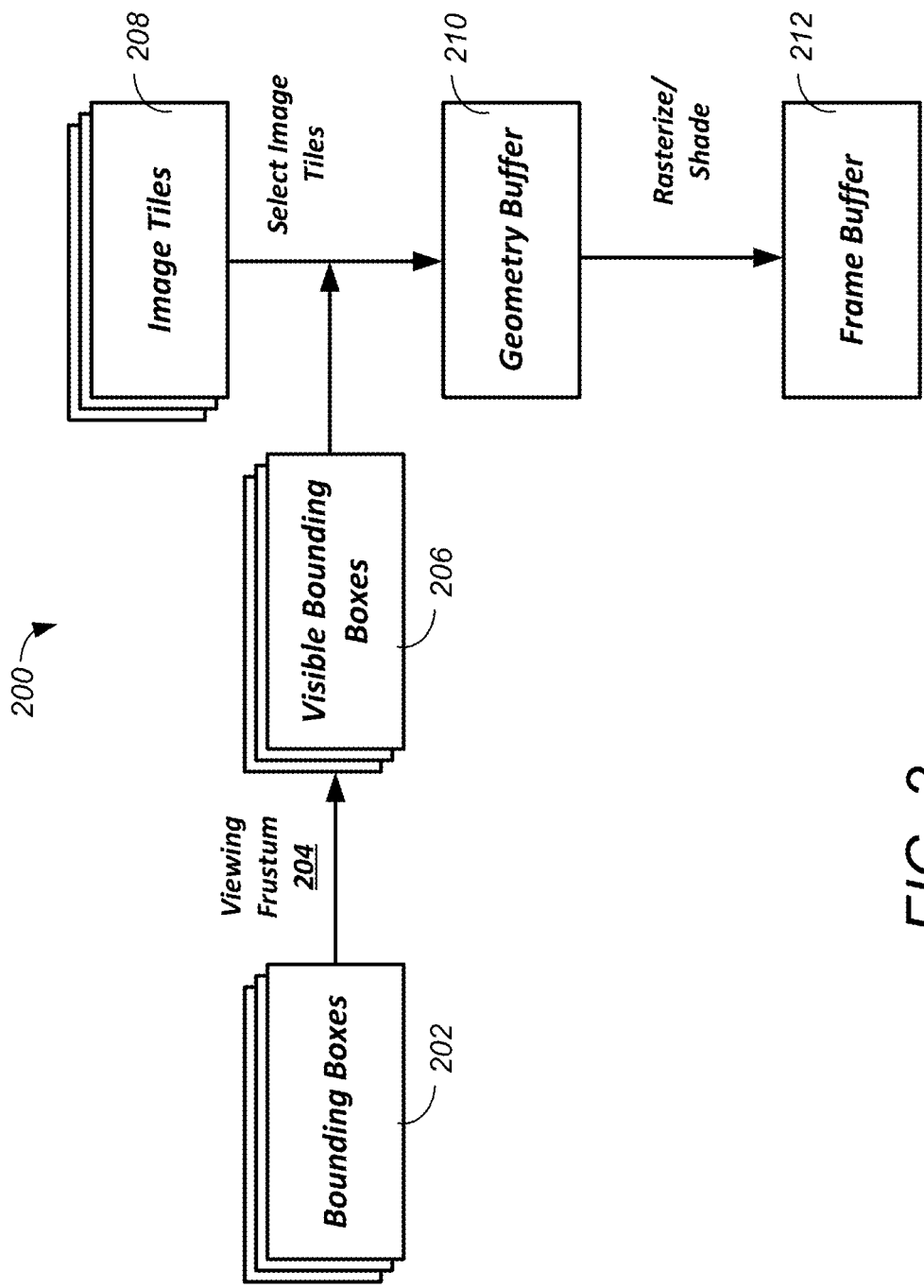
FIG. 2 is a diagram of an example process for rendering three-dimensional content.

An example process 200 for rendering three-dimensional content is shown in FIG. 2. The process 200 can be performed, for example, by the renderer 110 based on decoded content received from the decoder 108.

As shown in FIG. 2, a computer system receives data representing several bounding boxes 202. As described above, each of the bounding boxes 202 encloses at least a portion of the three-dimensional content to be rendered (e.g., an object in the three-dimensional content). In some implementations, the data can include, for each of the bounding boxes 202, a spatial location of the bounding box 202, the dimensions of the bounding box 202, and an orientation of the bounding box 202.

Figure 3A:
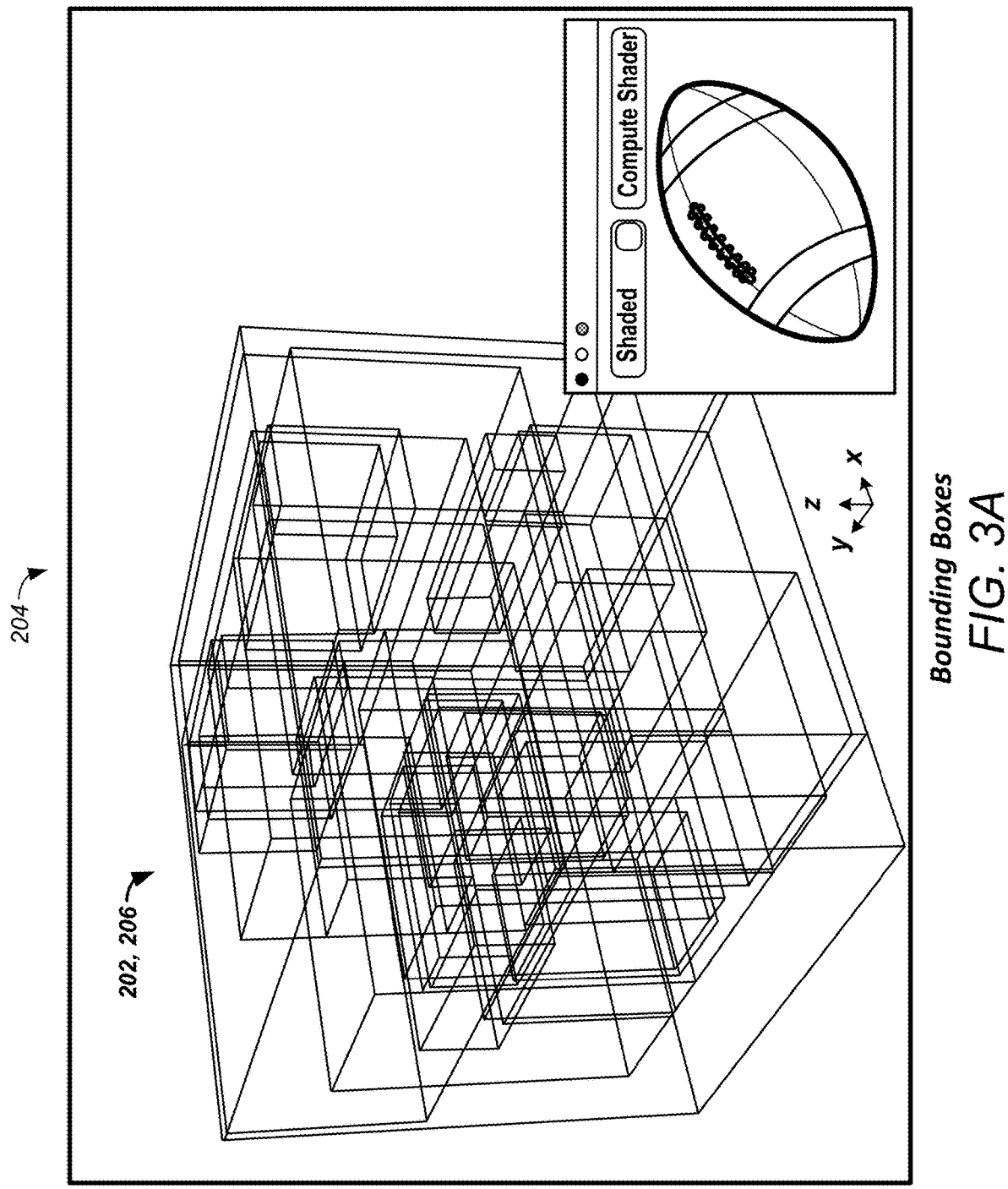
FIG. 3A is a diagram of example bounding boxes depicted according to a viewing frustum.

FIG. 3A shows several examples bounding boxes 202 arranged in space. In this example, each of the bounding boxes 202 encloses at least a portion of an object 302 (shown separately in an inset A). As shown in FIG. 3A, each of bounding boxes 202 is a three-dimensional cuboid (e.g., a square cuboid or rectangular cuboid) having six quadrilateral faces. For each of the bounding boxes 202, each of its faces is aligned in a different direction with respect to the x, y, and z axes. Further, at least some of the bounding boxes 202 have dimensions that are different from those of other ones of the bounding boxes 202. Further, at least some of the bounding boxes 202 overlap after ones of the bounding boxes 202 in space.

The computer system also receives data regarding a viewing frustum 204 from which the three-dimensional content is to be rendered. The viewing frustum is the region in space in the three-dimensional content that is to appear in the rendered content. For example, the viewing frustum 204 can be defined according to a particular location, orientation, and/or field of view with which the three-dimension content is to be rendered for presentation to a user. As an example, FIG. 3A shows an example viewing frustum 204, representing a particular viewport (e.g., a polygon viewing region) according to which the rendered content is to be presented to a user. According to the viewport specified by the viewing frustum 204, the bounding boxes 202 are arranged spatially relative to one another, as if they were being viewed by an eye or recorded using a camera from a particular location and according to a particular perspective.

In some implementations, a viewing frustum can be specified using a frustum (e.g., a truncation with parallel planes) of a pyramid of vision that represents a cone of vision of a notional camera or eye, according to which the three-dimensional content is to be rendered. In some implementations, the viewing frustum can be specified using a reference point and a vector extending from the reference point (e.g., specifying the point of view of the rendering), and one or more planes (e.g., indicating the field of view of the rendering).

The computer system determines which of the bounding boxes 202 would be visible according to the viewport specified by the viewing frustum 204, and identifies the visible bounding boxes 206. Visible bounding boxes 206 can be the bounding boxes that are (or would be) visually perceivable from the viewport specified by the viewing frustum 204. As an example, the computer system can determine, based on the viewport specified by the viewing frustum, whether each of the bounding boxes 202 would be obscured by other ones of the bounding boxes 202 according to that viewport (e.g., obscured by other ones of the bounding boxes 202 that are positioned in front of that bounding box 202). The bounding boxes 202 are not obscured by other bounding boxes 202 or are only partially obscured by the bounding boxes 202 can be selected as the visible bounding boxes 206. The bounding boxes 202 that are entirely obscured by other bounding boxes 202 can be omitted from selection.

Further, the computer system can select one or more image tiles 208 corresponding to the visible bounding boxes 206. Each of the bounding boxes 202 can be associated with a different respective geometry image. Further, each of the geometry images can indicate the spatial location of each of several points of an object. The computer system can select the geometry images that correspond to the visible bounding boxes 206, and omit the remaining geometry images (e.g., corresponding to the entirely obscured bounding boxes 202) from selection.

Further, the computer system can scan the pixels of the selected image tiles 208 into a geometry buffer 210. For example, as described above, each of the pixels of a geometry image can specify the location of a particular point on a surface of the object (e.g., the red, green, and blue values of each pixel can indicate the spatial location of a respective point in according to x, y, and z axes in a Cartesian coordinate system). The computer system can examine each of the pixels of the geometry images, determine a spatial location of a respective point based on the characteristics of the pixel, and add a corresponding pixel in the geometry buffer 210 at the determined spatial location.

As described above, in some implementations, the image tiles 208 can include one or more mipmaps that include information regarding the three-dimensional content according to different resolution and levels of detail. Further, for each of the visible bounding boxes 206, the computer system can select scans from a particular portion of the corresponding mipmap according to the level of detail that is desired for the rendering. For example, for bounding boxes 206 are that nearer to the reference point of the rendering (e.g., the origin of the viewing frustum), the computer system can scan pixels from a higher resolution portion of the mipmap for that bounding box 206, such that a greater level of detail can be presented to user. As another example, for bounding boxes 206 are that further to the reference point of the rendering, the computer system can scan pixels from a lower resolution portion of the mipmap for that bounding box 206, such that a lower level of detail can be presented to user (e.g., to conserve processing sources during the rendering of the three-dimensional content).

In some implementations, the geometry buffer 210 can be a portion of memory of the computer system (e.g., random access memory, RAM), that stores information regarding the geometry of one or more objects in three-dimensional content to be rendered and presented to a user. In some implementations, the geometry buffer can include a number of memory units (e.g., software and/or hardware registers), each of which can be used to store information regarding a particular point in three-dimensional space.

Figure 3B:
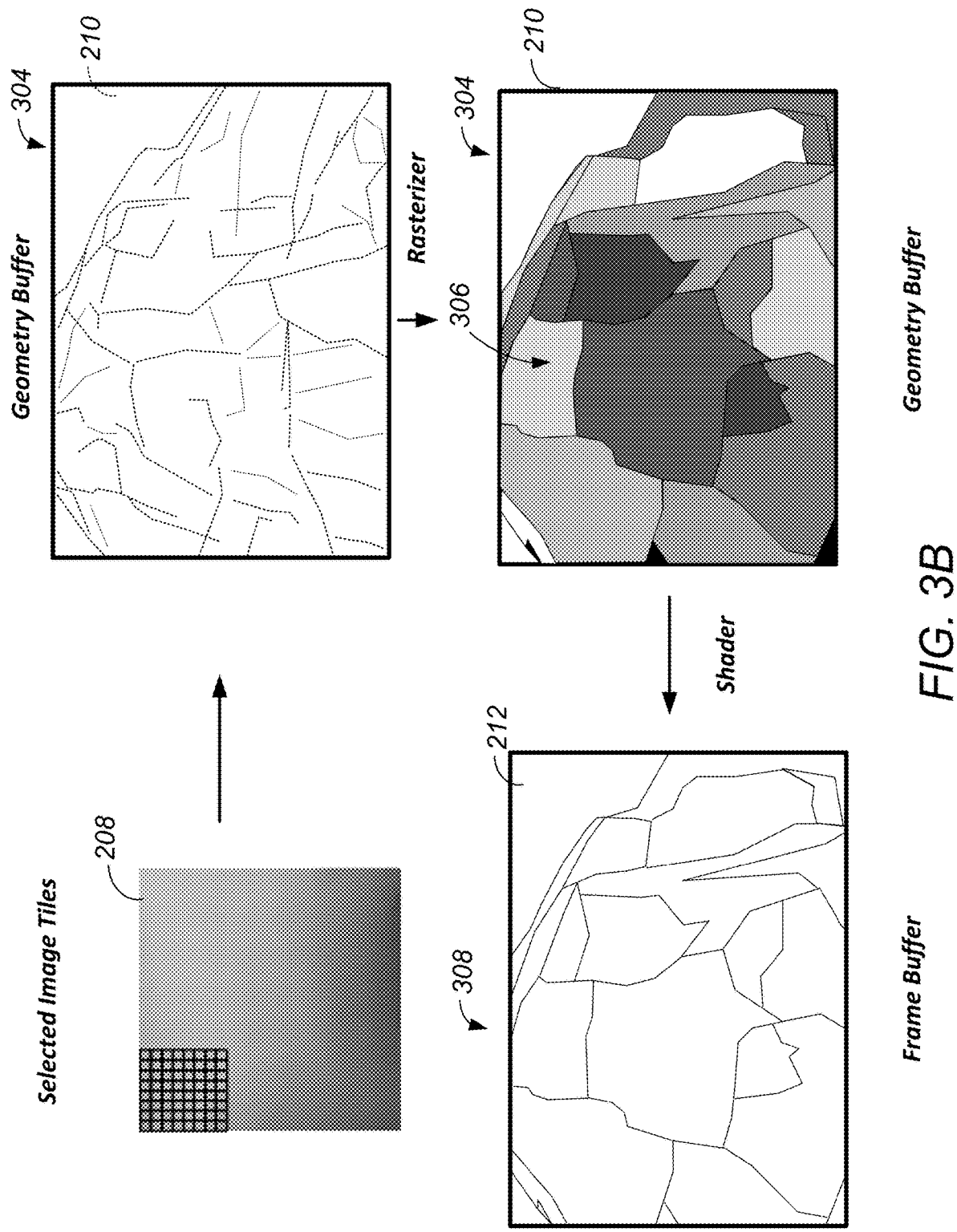
FIG. 3B is a diagram showing aspects of an example rendering process.

As an example, as shown in FIG. 3B, the pixels of the selected image tiles 208 (and/or their corresponding mipmaps) can be scanned into a geometry buffer 210, such that several corresponding pixels 304 are formed in the geometry buffer 210. For ease of understanding, the geometry buffer 210 is depicted in FIG. 3B according to a three-dimensional view (e.g., a perspective view), such that the locations of the pixels 304 can be ascertained visually. Further, for ease of illustration, only a portion of the geometry buffer 210 is shown in FIG. 3B (e.g., corresponding to a portion of the object 302).

Further, the computer system can rasterize the information contained within the geometry buffer into a frame buffer 212 for display on an output device. For example, the computer system can draw one or more polygons (e.g., triangles, quadrilaterals, or any other polygons) to interconnect the pixels in the geometry buffer 210. In some implementations, the computer systems can interconnect three spatially adjacent pixels 304 in the geometry buffer 210 by drawing a triangle in the geometry buffer 210, which each vertex of the triangle coinciding with the location of a respective one of the pixels 304.

As an example, as shown in FIG. 3B, the computer systems can interconnect spatially adjacent pixels 304 in the geometry buffer 210 by drawing triangles 306 in the geometry buffer 210, which each vertex of the triangle 306 coinciding with the location of a respective one of the pixels 304. Collectively, the triangles 306 can represent one or more surfaces of the object 302 contained within the three-dimensional content.

Further, based on the geometry information contained within the geometry buffer 210, the computer system can determine one or more pixels that are to be displayed on a display device (e.g., the output device 112) to represent the visible appearance of the three-dimensional content. For example, the three-dimensional data included in the geometry buffer can be flatted into two dimensions for display on a two-dimensional display device. Further, the polygons in the geometry buffer can be shaded to represent a texture, color, or visual pattern of the surfaces of the object.

In some implementations, the frame buffer 212 can be a portion of memory of the computer system (e.g., RAM), that stores information regarding a video frame to be displayed to a user using a display device. In some implementations, the frame buffer can include a number of memory units (e.g., software and/or hardware registers), each of which can be used to store information regarding a particular point in the video frame (e.g., a particular pixel of the video frame). In some implementations, the frame buffer can store information in the form of a bitmap, and output one or more video signals that can be interpreted by the display device to display content to a user.

As an example, as shown in FIG. 3B, the computer system can flatten the three-dimensional data contained within the geometry buffer 210 into two-dimensional data (e.g., a bitmap 308) for storage in the frame buffer 212. Further, the computer system can shade the bitmap 308 to represent a texture, color, or visual pattern of the surfaces of the object 302.

Figure 3C:
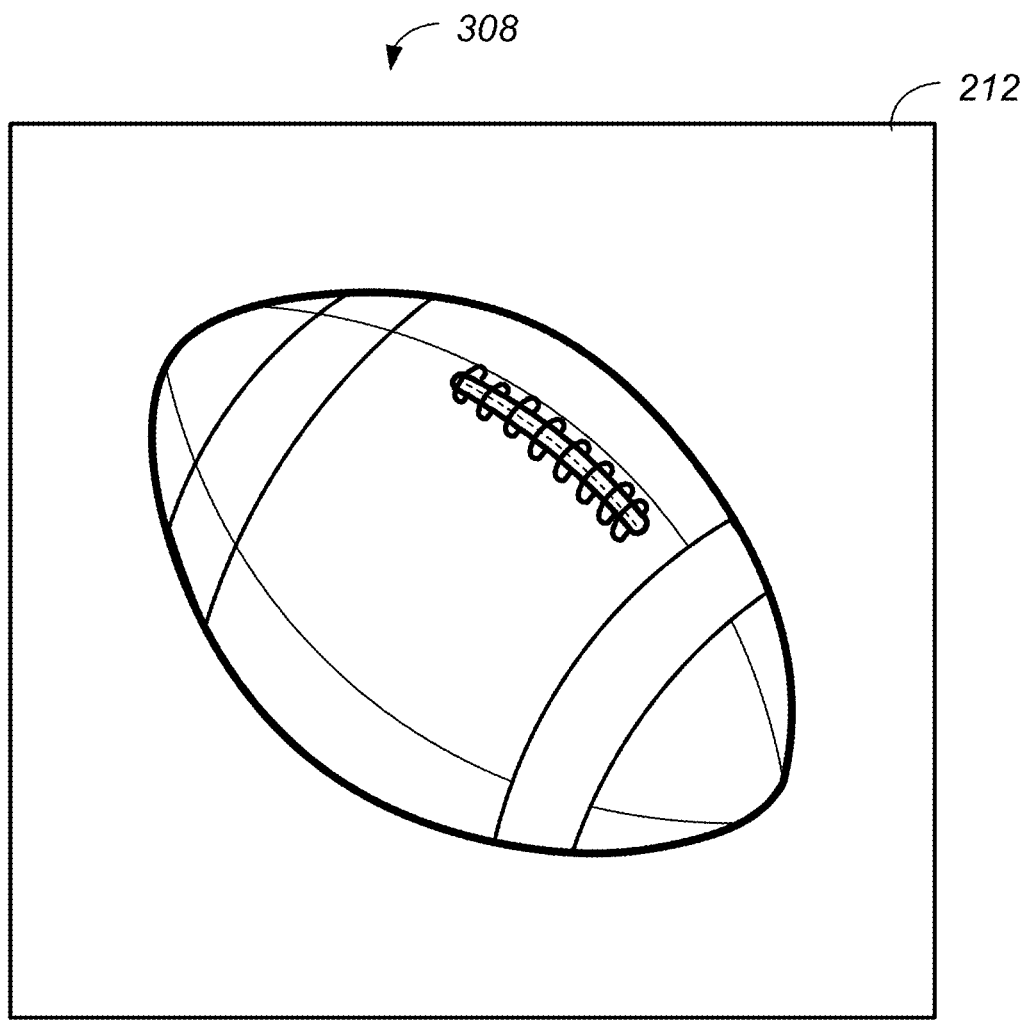
FIG. 3C is a diagram of example rendered content.

The contents of the frame buffer 212 can be used to generate one or more video signals that can be interpreted by the display device to display content to a user. For example, FIG. 3C shows an example of the bitmap 308, showing the object 302 according to the perspective specified by the viewing frustum 204. The bitmap 308 can be used to generate one or more video signals that specify the order that each of the pixels of the bitmap 308 should be displayed on a display device and/or the location of each of the pixels on the display device, such that the contents of the bitmap 308 is presented on the display device in a visually coherent manner.

In some implementations, at least some of the video signals can be analog signals. Example analog signals include composite video signals (e.g., Television System Committee (NTSC) signals, Phase Alternating Line (PAL) signals, and SECAM signals), S-Video signals, Video Graphics Array (VGA) signals, and Digital Visual Interface Analog Mode (DVI-A) signals. In some implementations, at least some of the video signals can be digital signals. Example digital signals include Digital Visual Interface Digital Mode (DVI-D) signals, High-Definition Multimedia Interface (HDMI) signals, and Video Electronics Standards Association (VESA) DisplayPort signals. In some implementations, at least some of the video signals can include both analog and digital signals.

Figure 4:
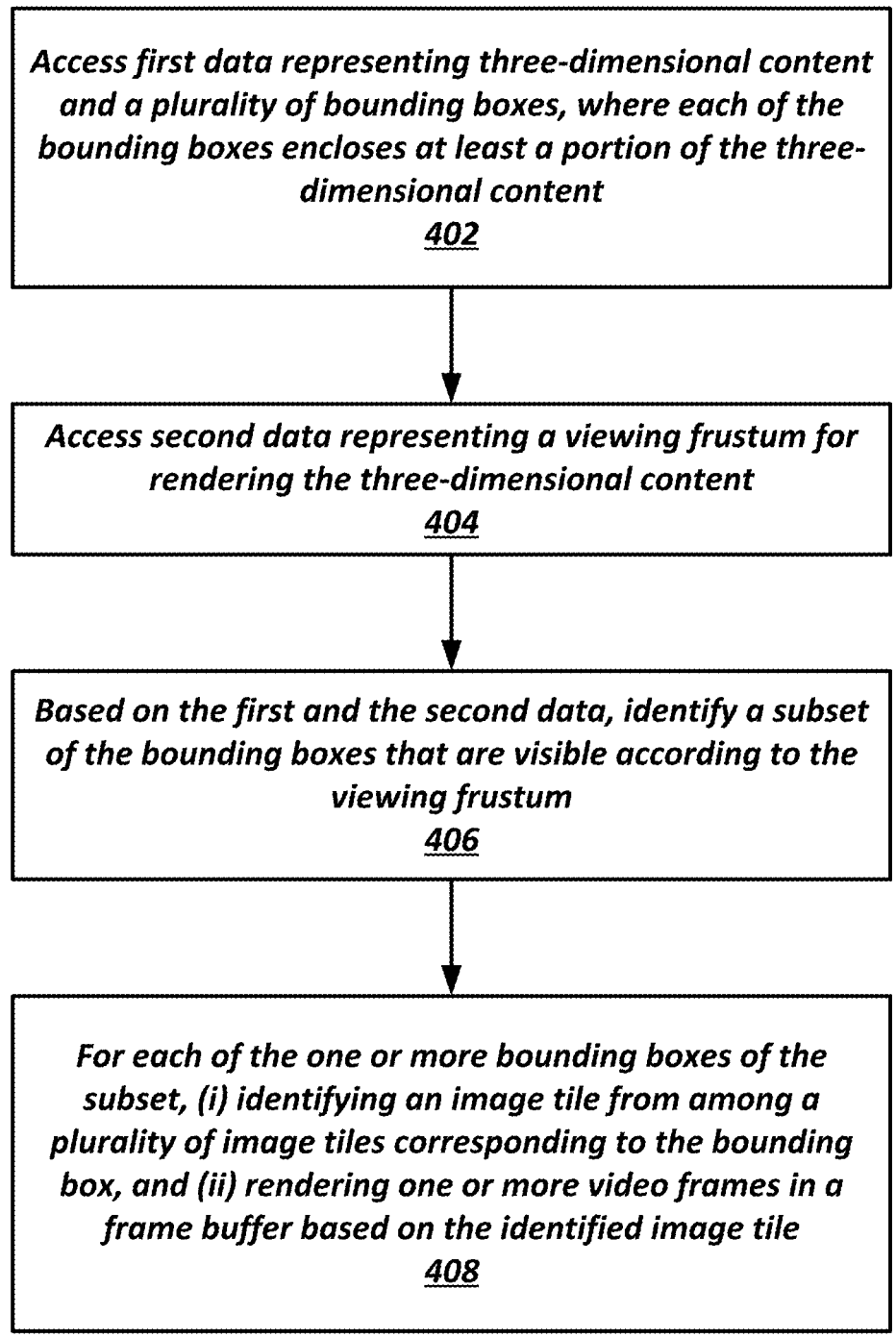
FIG. 4 is a diagram of an example process for rendering three-dimensional content.

The rendering process described herein can be performed multiple times to render multiple different video frames for presentation on a display device. For example, for each video frame, Example Processes FIG. 4 shows an example process 400 for rendering three-dimensional content (e.g., for presentation to one or more users). The process 400 can be performed, at least in part, using one or more devices (e.g., one or more of the computer systems shown in FIG. 5).

According to the process 400, a computer system accesses first data representing three-dimensional content and a plurality of bounding boxes (block 402). Each of the bounding boxes encloses at least a portion of the three-dimensional content.

Example three-dimensional content and bounding boxes are shown, for example, in FIG. 3A. In some implementations, the three-dimensional content can one or more three-dimensional models. In some implementations, the three-dimensional content can include volumetric content.

The computer system accesses second data representing a viewing frustum for rendering the three-dimensional content (block 404). An example viewing frustum is shown, for example, in FIG. 3A.

Based on the first and the second data, the computer system identifies a subset of the bounding boxes that are visible according to the viewing frustum (block 406). In some implementations, the subset of the bounding boxes can be identified by determining a viewport for rendering the three-dimensional content based on the viewing frustum, and determining that the subset of the bounding boxes are visible according to viewport.

For each of the one or more bounding boxes of the subset, the computer system identifies an image tile from among a plurality of image tiles corresponding to the bounding box, and renders one or more video frames in a frame buffer based on the identified image tile (block 408).

In some implementations, the one or more video frames can be rendered in the frame buffer by scanning pixels of the identified image tile into a geometry buffer. The pixels of the identified image tile can be retrieved from a mipmap that includes a plurality of portions. Each of portions of the mipmap can correspond to a respective distance from a viewpoint of the viewing frustum and/or a respective level of detail.

Further, one or more polygons can be drawing in the can be drawn in the geometry buffer, such that the polygons connect the pixels. In some implementations, the one or more polygons can include one or more triangles or other shapes.

Further, the pixels in the geometry buffer can be scanned into the frame buffer. Further, the pixels of the frame buffer can be shaded.

Additional details regarding an example rendering process are described, for example, with reference to FIG. 3B.

Example Computer System

Figure 5:
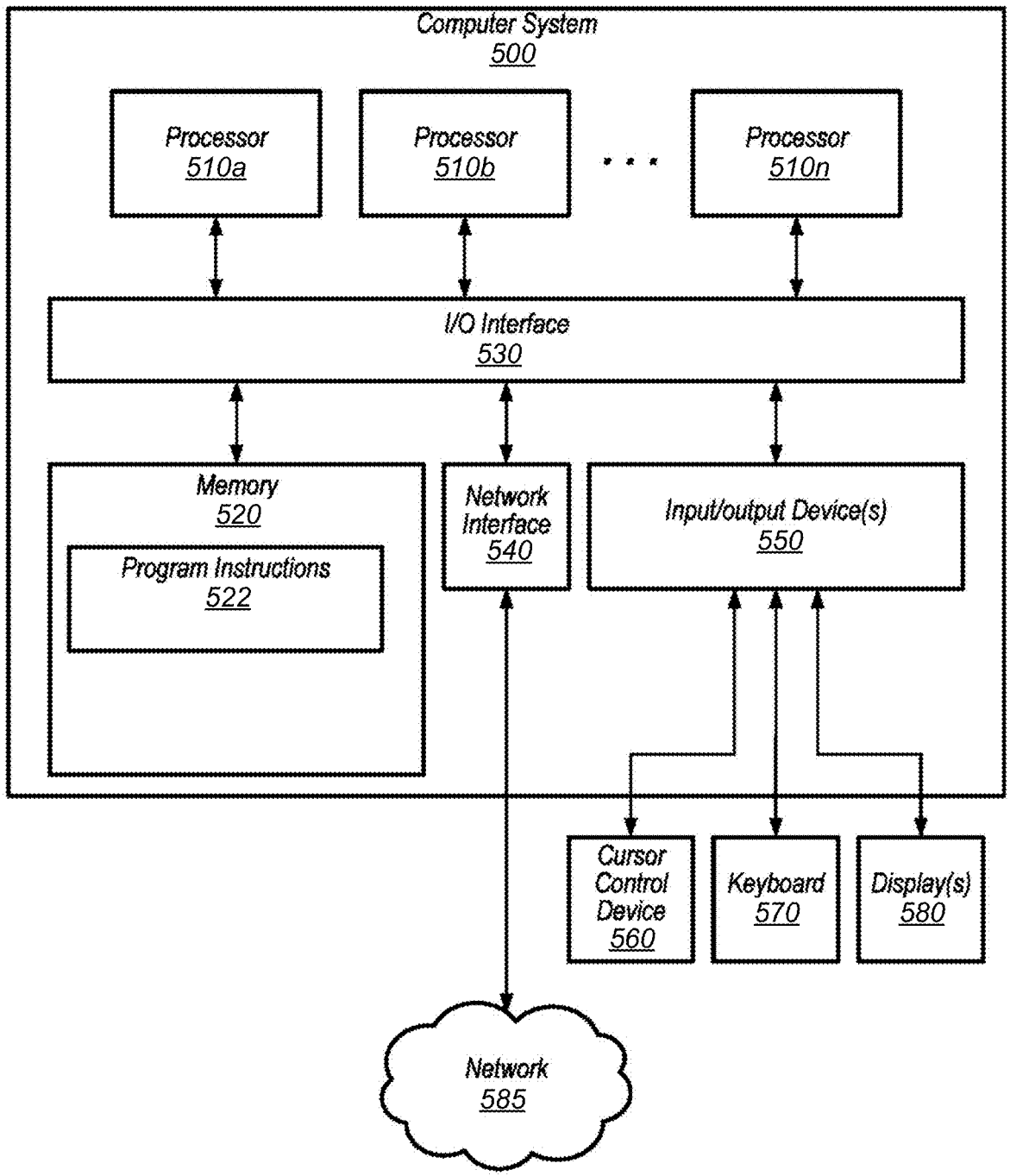
FIG. 5 is a diagram of an example computer system.

FIG. 5 illustrates an example computer system 500 that may implement an encoder, decoder, renderer, or any other ones of the components described herein, (e.g., any of the components described above with reference to FIGS. 1-4). The computer system 500 may be configured to execute any or all of the embodiments described above. In different embodiments, computer system 500 may be any of various types of devices, including, but not limited to, a personal computer system, desktop computer, laptop, notebook, tablet, slate, pad, or netbook computer, mainframe computer system, handheld computer, workstation, network computer, a camera, a set top box, a mobile device, a consumer device, video game console, handheld video game device, application server, storage device, a television, a video recording device, a wearable device such as a wrist watch or a wearable display, a peripheral device such as a switch, modem, router, or in general any type of computing or electronic device.

Various embodiments of an encoder, decoder, or render as described herein may be executed in one or more computer systems 500, which may interact with various other devices. Note that any component, action, or functionality described above with respect to FIGS. 1-4 may be implemented on one or more computers configured as computer system 500 of FIG. 5, according to various embodiments. In the illustrated embodiment, computer system 500 includes one or more processors 510 coupled to a system memory 520 via an input/output (I/O) interface 530. Computer system 500 further includes a network interface 540 coupled to I/O interface 530, and one or more input/output devices 550, such as cursor control device 560, keyboard 570, and display(s) 580. In some cases, it is contemplated that embodiments may be implemented using a single instance of computer system 500, while in other embodiments multiple such systems, or multiple nodes making up computer system 500, may be configured to host different portions or instances of embodiments. For example, in one embodiment some elements may be implemented via one or more nodes of computer system 500 that are distinct from those nodes implementing other elements.

In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments processors 510 may be general-purpose or embedded processors implementing any of a variety of instruction set architectures (ISAs), such as the x86, PowerPC, SPARC, or MIPS ISAs, or any other suitable ISA. In multiprocessor systems, each of processors 510 may commonly, but not necessarily, implement the same ISA.

System memory 520 may be configured to store program instructions 522 and/or sensor data accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. In the illustrated embodiment, program instructions 522 may be configured to implement an image sensor control application incorporating any of the functionality described above. In some embodiments, program instructions and/or data may be received, sent or stored upon different types of computer-accessible media or on similar media separate from system memory 520 or computer system 500. While computer system 500 is described as implementing the functionality of functional blocks of previous Figures, any of the functionality described herein may be implemented via such a computer system.

In one embodiment, I/O interface 530 may be configured to coordinate I/O traffic between processor 510, system memory 520, and any peripheral devices in the device, including network interface 540 or other peripheral interfaces, such as input/output devices 550. In some embodiments, I/O interface 530 may perform any necessary protocol, timing or other data transformations to convert data signals from one component (e.g., system memory 520) into a format suitable for use by another component (e.g., processor 510). In some embodiments, I/O interface 530 may include support for devices attached through various types of peripheral buses, such as a variant of the Peripheral Component Interconnect (PCI) bus standard or the Universal Serial Bus (USB) standard, for example. In some embodiments, the function of I/O interface 530 may be split into two or more separate components, such as a north bridge and a south bridge, for example. Also, in some embodiments some or all of the functionality of I/O interface 530, such as an interface to system memory 520, may be incorporated directly into processor 510.

Network interface 540 may be configured to allow data to be exchanged between computer system 500 and other devices attached to a network 585 (e.g., carrier or agent devices) or between nodes of computer system 500. Network 585 may in various embodiments include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 540 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 550 may, in some embodiments, include one or more display terminals, keyboards, keypads, touchpads, scanning devices, voice or optical recognition devices, or any other devices suitable for entering or accessing data by one or more computer systems 500. Multiple input/output devices 550 may be present in computer system 500 or may be distributed on various nodes of computer system 500. In some embodiments, similar input/output devices may be separate from computer system 800 and may interact with one or more nodes of computer system 500 through a wired or wireless connection, such as over network interface 540.

As shown in FIG. 5, memory 520 may include program instructions 522, which may be processor-executable to implement any element or action described above. In one embodiment, the program instructions may implement the methods described above. In other embodiments, different elements and data may be included. Note that data may include any data or information described above.

Those skilled in the art will appreciate that computer system 500 is merely illustrative and is not intended to limit the scope of embodiments. In particular, the computer system and devices may include any combination of hardware or software that can perform the indicated functions, including computers, network devices, Internet appliances, PDAs, wireless phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 800 may be transmitted to computer system 500 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer accessible medium. Generally speaking, a computer-accessible medium may include a non-transitory, computer-readable storage medium or memory medium such as magnetic or optical media, e.g., disk or DVD/CD-ROM, volatile or non-volatile media such as RAM (e.g., SDRAM, DDR, RDRAM, SRAM, etc.), ROM, etc. In some embodiments, a computer-accessible medium may include transmission media or signals such as electrical, electromagnetic, or digital signals, conveyed via a communication medium such as network and/or a wireless link.

The methods described herein may be implemented in software, hardware, or a combination thereof, in different embodiments. In addition, the order of the blocks of the methods may be changed, and various elements may be added, reordered, combined, omitted, modified, etc. Various modifications and changes may be made as would be obvious to a person skilled in the art having the benefit of this disclosure. The various embodiments described herein are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

What is claimed is:

1. A method comprising:
    accessing, by a computer system, first data representing three-dimensional content and a plurality of bounding boxes, wherein each of the bounding boxes encloses at least a portion of the three-dimensional content;
    accessing, by the computer system, second data representing a viewing frustum for rendering the three-dimensional content;
    based on the first and the second data, identifying, by the computer system, a subset of the bounding boxes that are visible according to the viewing frustum; and
    for each of the one or more bounding boxes of the subset:
        identifying an image tile from among a plurality of image tiles corresponding to the bounding box, wherein for each pixel of the image tile:
            the pixel represents a location of a respective point on an object of the three-dimensional content, and
            one or more color values of the pixel represent the location of the respective point according to one or more respective coordinate axes, and
        rendering one or more video frames in a frame buffer based on the identified image tile.

2. The method of claim 1, wherein identifying the subset of the bounding boxes comprises:
    determining a viewport for rendering the three-dimensional content based on the viewing frustum; and
    determining that the subset of the bounding boxes is visible according to viewport.

3. The method of claim 1, wherein rendering the one or more video frames in the frame buffer comprises:
    scanning pixels of the identified image tile into a geometry buffer.

4. The method of claim 3, wherein the pixels of the identified image tile are retrieved from a mipmap comprising a plurality of portions, wherein each of the portions corresponds to a respective distance from a viewpoint of the viewing frustum.

5. The method of claim 3, wherein the pixels of the identified image tile are retrieved from a mipmap comprising a plurality of portions, wherein each of the portions corresponds to a respective level of detail.

6. The method of claim 3, wherein rendering the one or more video frames in the frame buffer comprises:
    drawing, in the geometry buffer, one or more polygons connecting the pixels.

7. The method of claim 6, wherein the one or more polygons comprise one or more triangles.

8. The method of claim 6, wherein rendering the one or more video frames in the frame buffer comprises:

scanning the pixels in the geometry buffer into the frame buffer.

9. The method of claim 8, wherein rendering the one or more video frames in the frame buffer comprises:
shading the pixels of the frame buffer.

10. The method of claim 1, wherein the three-dimensional content comprises one or more three-dimensional models.

11. A device comprising:
one or more processors; and
memory storing instructions that when executed by the one or more processors, cause the one or more processors to perform operations comprising:
accessing first data representing three-dimensional content and a plurality of bounding boxes, wherein each of the bounding boxes encloses at least a portion of the three-dimensional content;
accessing second data representing a viewing frustum for rendering the three-dimensional content;
based on the first and the second data, identifying a subset of the bounding boxes that are visible according to the viewing frustum; and
for each of the one or more bounding boxes of the subset:
identifying an image tile from among a plurality of image tiles corresponding to the bounding box, wherein for each pixel of the image tile:
the pixel represents a location of a respective point on an object of the three-dimensional content, and
one or more color values of the pixel represent the location of the respective point according to one or more respective coordinate axes, and
rendering one or more video frames in a frame buffer based on the identified image tile.

12. The device of claim 11, wherein identifying the subset of the bounding boxes comprises:
determining a viewport for rendering the three-dimensional content based on the viewing frustum; and
determining that the subset of the bounding boxes is visible according to viewport.

13. The device of claim 11, wherein rendering the one or more video frames in the frame buffer comprises:
scanning pixels of the identified image tile into a geometry buffer.

14. The device of claim 13, wherein the pixels of the identified image tile are retrieved from a mipmap comprising a plurality of portions, wherein each of the portions corresponds to a respective distance from a viewpoint of the viewing frustum.

15. The device of claim 13, wherein the pixels of the identified image tile are retrieved from a mipmap comprising a plurality of portions, wherein each of the portions corresponds to a respective level of detail.

16. The device of claim 13, wherein rendering the one or more video frames in the frame buffer comprises:
drawing, in the geometry buffer, one or more polygons connecting the pixels.

17. The device of claim 16, wherein the one or more polygons comprise one or more triangles.

18. The device of claim 16, wherein rendering the one or more video frames in the frame buffer comprises:
scanning the pixels in the geometry buffer into the frame buffer.

19. The device of claim 18, wherein rendering the one or more video frames in the frame buffer comprises:
shading the pixels of the frame buffer.

20. The device of claim 11, wherein the three-dimensional content comprises one or more three-dimensional models.

21. A non-transitory, computer-readable storage medium having instructions stored thereon, that when executed by one or more processors, cause the one or more processors to perform operations comprising:
accessing first data representing three-dimensional content and a plurality of bounding boxes, wherein each of the bounding boxes encloses at least a portion of the three-dimensional content;
accessing second data representing a viewing frustum for rendering the three-dimensional content;
based on the first and the second data, identifying a subset of the bounding boxes that are visible according to the viewing frustum; and
for each of the one or more bounding boxes of the subset:
identifying an image tile from among a plurality of image tiles corresponding to the bounding box, wherein for each pixel of the image tile:
the pixel represents a location of a respective point on an object of the three-dimensional content, and
one or more color values of the pixel represent the location of the respective point according to one or more respective coordinate axes, and
rendering one or more video frames in a frame buffer based on the identified image tile.

22. The non-transitory, computer-readable storage medium of claim 21, wherein identifying the subset of the bounding boxes comprises:
determining a viewport for rendering the three-dimensional content based on the viewing frustum; and
determining that the subset of the bounding boxes is visible according to viewport.

23. The non-transitory, computer-readable storage medium of claim 21, wherein rendering the one or more video frames in the frame buffer comprises:
scanning pixels of the identified image tile into a geometry buffer.

24. The non-transitory, computer-readable storage medium of claim 23, wherein the pixels of the identified image tile are retrieved from a mipmap comprising a plurality of portions, wherein each of the portions corresponds to a respective distance from a viewpoint of the viewing frustum.

25. The non-transitory, computer-readable storage medium of claim 23, wherein the pixels of the identified image tile are retrieved from a mipmap comprising a plurality of portions, wherein each of the portions corresponds to a respective level of detail.

26. The non-transitory, computer-readable storage medium of claim 23, wherein rendering the one or more video frames in the frame buffer comprises:
drawing, in the geometry buffer, one or more polygons connecting the pixels.

27. The non-transitory, computer-readable storage medium of claim 26, wherein the one or more polygons comprise one or more triangles.

28. The non-transitory, computer-readable storage medium of claim 26, wherein rendering the one or more video frames in the frame buffer comprises:
scanning the pixels in the geometry buffer into the frame buffer.

29. The non-transitory, computer-readable storage medium of claim 28, wherein rendering the one or more video frames in the frame buffer comprises:
shading the pixels of the frame buffer.

30. The non-transitory, computer-readable storage medium of claim 21, wherein the three-dimensional content comprises one or more three-dimensional models.

* * * * *